O. G. NEWTON.
Harrows.

No. 151,505.

Patented June 2, 1874.

WITNESSES
F. Connolly
J. B. Connolly

Obadiah G. Newton.
INVENTOR,
By
Attorney.

UNITED STATES PATENT OFFICE.

OBADIAH G. NEWTON, OF GRUNDY COUNTY, MISSOURI.

IMPROVEMENT IN HARROWS.

Specification forming part of Letters Patent No. 151,505, dated June 2, 1874; application filed December 27, 1873.

*To all whom it may concern:*

Be it known that I, OBADIAH G. NEWTON, of Grundy county, in the State of Missouri, have invented new and useful Improvements in Harrows for Agricultural Purposes, of which the following is an exact and clear specification, reference being had to the accompanying drawings and to the figures and letters of reference thereon, which are made parts of this specification.

Figure 1:
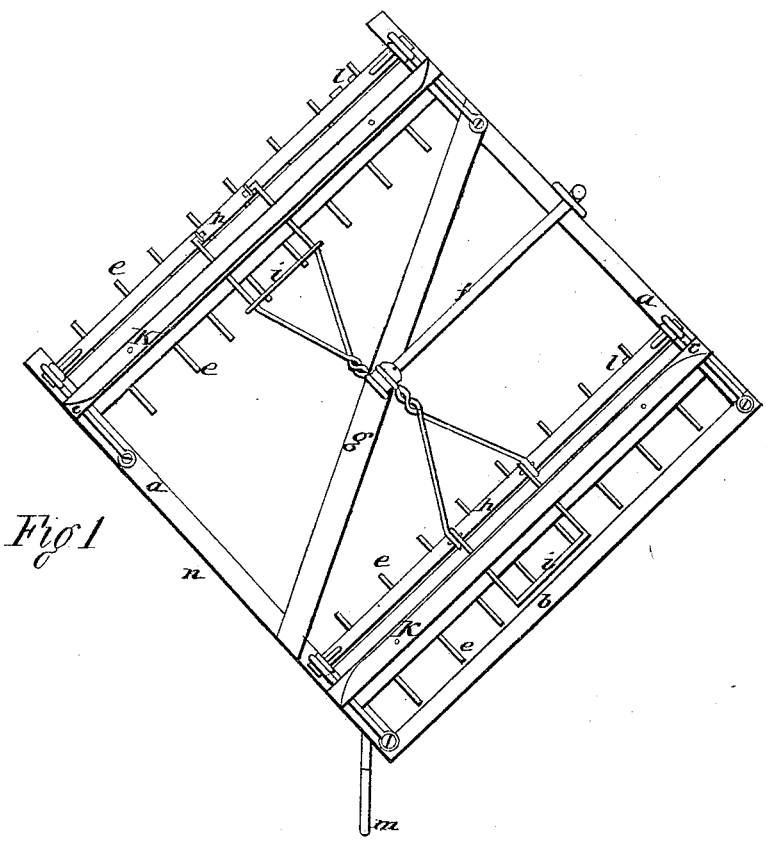
Figure 2:
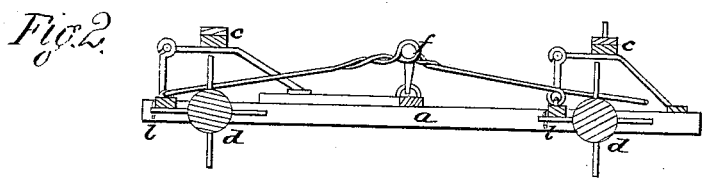
Figure 3:
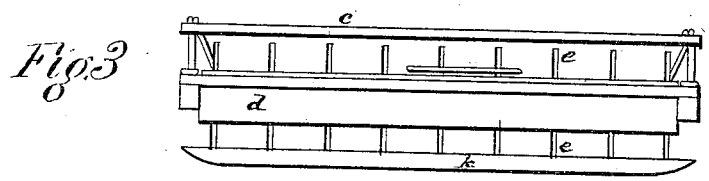
Figure 4:
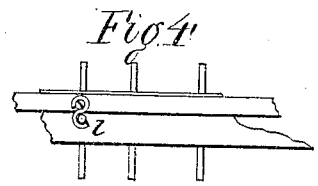

Figure 1 is a top view. Fig. 2 is a longitudinal section. Fig. 3 is an end view. Fig. 4 shows one of the details.

This harrow has two rollers in a square frame, braced angularly. The draft is applied from the corner. The frame $a\ a$ is further strengthened by the front cross-piece $b$ and the timbers $c\ c$ above the teeth, these timbers serving also as fenders or guards. The rollers $d\ d$ revolve on journals let into the sides of the frame, and are provided with double-length teeth $e\ e$. These teeth are to be made square and pointed, as harrow-teeth usually are. A lever, $f$, with handle, is affixed to the side of the frame and the center of the angular brace $g$, which operates the scrapers $h\ h$ and steadying-frames $i\ i$. A separate lever can be applied for each scraper, whenever thought desirable. The scrapers $h\ h$ are hinged to the brace supporting the timbers $c\ c$, and the rods passing through the ends of these scrapers should be provided with a screw and nut, so that each scraper may be raised or lowered at will. The front pieces of the steadying-frame should also be set on with screws, so that they may be moved as the teeth wear short. I also provide my harrow with false shoes $k\ k$, or runners. Small hooks $l\ l$, Fig. 4, are also fixed to each scraper. The hook is to catch one of the teeth of each roller and hold it stationary, while the false shoe is placed on the lower row of teeth, as shown in Fig. 3. The harrow, being thus turned into a sled, can, by hitching to the center of the frame, at a point opposite the lever, be now drawn to or from the field without danger of bending or injuring the teeth from contact with stones, stumps, or other obstructions. When at work the runners or false shoes are taken off the teeth and placed on the pins on the timbers $c\ c$, as shown in Fig. 1. The draft-hook $m$ is applied at the corner of the frame of the harrow, which is, therefore, drawn crosswise, giving as much pressure endwise on the tooth-shaft as sidewise. While in motion the upper teeth will rest on the front piece of the steadying-frame and hold the lower teeth to the ground; but if the lever be pulled forward the shaft will revolve until the lower teeth are brought into contact with the scraper, which is then used, by a simple motion of the lever, to clear the teeth from all grass, weeds, or trash that may have adhered to them. The scrapers may be made of iron, or of wood and ironed on the bottom.

By removing the draft-hook from the corner of the frame and attaching it to the side, near the end of the angular brace, (at $n$, Fig. 1,) the harrow may be drawn so as to pass over rows of young corn without injury, and thus serve as a cultivator or plow.

The mode of operation is so simple that further description seems to be unnecessary. The advantages of my invention will readily present themselves to all who use agricultural implements.

I claim as of my invention and desire to secure by Letters Patent—

1. The scrapers and steadying-frames, operated by a lever affixed to the side of the frame and the center of the angular brace, in combination with the revolving shafts, as described and shown, and for the purposes set forth.

2. The false shoes or runners, in combination with the hooks $l$ and revolving harrow, substantially as specified, and for the purposes set forth.

3. The combination of revolving harrow $d$ with the angular brace $g$, scrapers $h$, steadying-frames $i$, and lever or levers $f$, as set forth and shown.

In testimony that I claim the above I have hereunto signed my name before two witnesses.

OBADIAH G. NEWTON.

Witnesses:
 WM. H. ROBERTS,
 W. A. BERRY.